United States Patent [19]

Kuan et al.

[11] Patent Number: 4,891,409
[45] Date of Patent: Jan. 2, 1990

[54] SINGLE PHASE SHAPE-TRANSFORMABLE ELASTOMERIC COMPOUNDS

[75] Inventors: Tiong H. Kuan, Hudson; Raymond C. Srail, Parma; Thomas R. Szczepanski, North Royalton, all of Ohio

[73] Assignee: R.J.F. International, Brecksville, Ohio

[21] Appl. No.: 189,937

[22] Filed: May 3, 1988

Related U.S. Application Data

[63] Continuation of Ser. No. 855,242, Apr. 24, 1986, abandoned.

[51] Int. Cl.$^4$ .............................. C09L 9/02; C09L 9/06
[52] U.S. Cl. .................................... 525/237; 525/129; 525/130; 525/186; 525/187; 525/189; 525/208; 525/210; 525/215; 525/224; 525/233; 525/240; 525/241
[58] Field of Search ............... 525/185, 186, 129, 130, 525/215, 237, 224, 233, 232, 210, 189

[56] References Cited

U.S. PATENT DOCUMENTS 3,354,107 11/1967 Hamed ............................. 525/132

*Primary Examiner*—Jacob Ziegler
*Attorney, Agent, or Firm*—Daniel J. Hudak Co.

[57] ABSTRACT

Crystalline elastomeric network compositions are transformable from their original cured shape into an altered shape and subsequently back to their original shape. The transformation process, which is repeatable, is effected by the simultaneous application of heat and deformation forces. The amount of heat required, expressed in terms of temperature, is relatively low. The shape-transformable compositions of the present invention are single phase blends of one or more crystalline polymers and one or more elastomer polymers. The compositions generally have a single broad endotherm due probably to the co-crystallization of the different crystalline segments, a low glass transition temperature, and a low transformation temperature, that is generally less than 100° C.

18 Claims, 1 Drawing Sheet

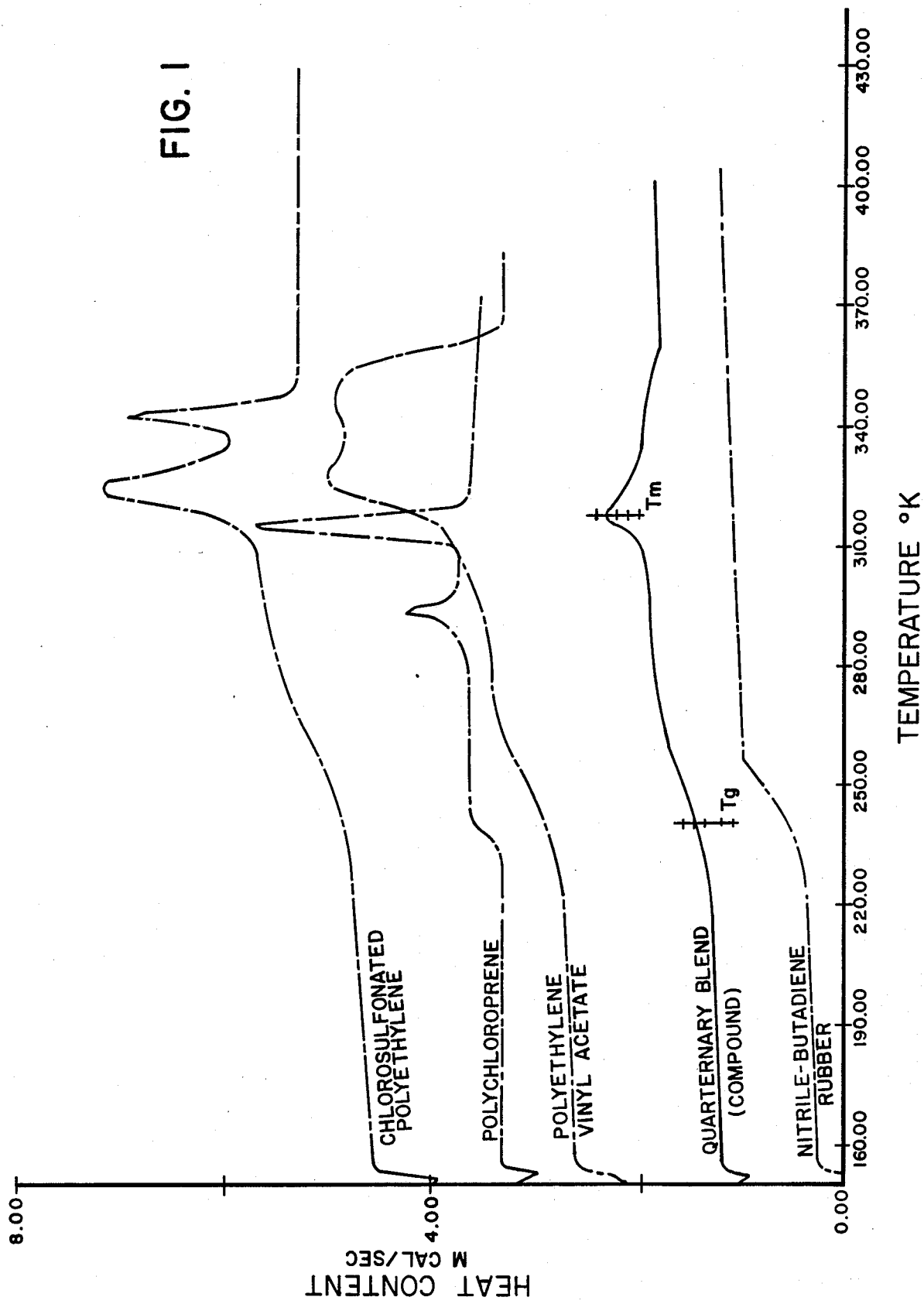

4,891,409

SINGLE PHASE SHAPE-TRANSFORMABLE ELASTOMERIC COMPOUNDS

This is a continuation of application of Ser. No. 855,242, filed Apr. 24, 1986, now abandoned.

TECHNICAL FIELD

The present invention relates to blends of crystalline and amorphous polymers having large elastic (recoverable) deformations and reversible shape transformations, (e.g. stretchability and compressibility). More specifically, the present invention relates to the above blends which exhibit homogeneous phase mixing and a low shape transformable temperature.

BACKGROUND OF THE INVENTION

A limited amount of compositions are available as shape transformable materials, particularly low temperature "triggerable" materials. These materials generally contain a single polymer component and are primarily used as heat shrinkable tubings. These compositions have high shape transformable temperatures, i.e. greater than 100° C.

Furu, Japanese Patent Application 85-278972 relates to the production of heat shrinkable tubes utilizing a coolant supplied through a porous die to directly contact the tube and also to act as a lubricant. No suggestion is made with regard to a single phase composition containing a crystalline polymer, an elastomeric polymer, or the like.

Neoprene has previously been utilized as a one component shape transformable elastomeric compound.

U.S. Pat. No. 3,724,107 to Mackinen and Srail relates to a material, which when heated, stretched, and cooled, will retain the stretched size and shape. The material is a blend of a thermoplastic rubber such as trans-1,4-polybutadiene and a conventional rubber such as cis-1,4-polybutadiene or cis-1,4-polyisoprene. Depending on the degree of crystallinity of the trans-1,4-polybutadiene, the shape transformation temperature required can be as high as 140° C.

SUMMARY OF THE INVENTION

The present invention generally relates to homogeneous shape-transformable compositions which comprise at least one crystalline polymer and at least one elastomer. The compositions are generally characterized by low glass transition temperatures, (Tg), low transformation temperatures (<100° C.), fairly compatible polymers and homogeneous mixtures.

In general, a transformable composition comprises a blend of at least one crystalline polymer and at least one elastomer polymer, said crystalline polymer having a crystallinity of from about 5% to about 95%, said elastomer having a Tg of −25° C. or less, and wherein the amount of said elastomer is an effective amount such that a compatible thermally activated shape transformable composition is formed.

BRIEF DESCRIPTION OF THE DRAWING

FIG. 1 relates to a graph of a quarternary ternary blend of polymers of the present invention and to the thermal transition behavior thereof.

PREFERRED EMBODIMENTS OF THE PRESENT INVENTION

The present invention generally relates to blends of a crystalline polymer component and an elastomeric polymer component which form thermally activated shape transformable (TAST) compositions. By the term "TAST", it is meant that the compositions can be shape transformed (stretched or compressed) under heat and retained in the transformed shape by cooling. Upon reheating, the compositions will return, or attempt to return, to their original shape (state). Thus, compositions can be stretched or expanded under heat. Upon cooling, the compositions can be retained in the stretched or expanded state or permitted to partially shrink such that a partial expansion of the stretched state is retained. Upon reheating, the composition will shrink or be converted to its original state. Similarly, the compositions can be compressed, that is, twisted or bent under heat and retained in such a position. Upon reheating, the compositions will untwist, that is, be converted to their original state.

The TAST blend contains a crystalline component, that is one or more polymers, at least one of which is crystalline at room temperature, and in combination with an elastomer component, that is one or more elastomer polymers, forms a homogeneous or single phase composition having TAST properties. The amount of crystallinity is important in that excessive amounts yield a composition which is generally too rigid and thus difficult to deform and that too low amounts yield a composition having inadequate freezable deformation.

The degree of crystallinity of the crystalline polymers usually ranges from about 5% to about 95%, desirably from about 10% to about 45%, and preferably from about 15% to about 35%. Generally, all of the various different crystalline polymers utilized are within these ranges. The various crystalline polymers used in this application can be generally divided into three melting classes, that is low melting crystalline polymers, intermediate melting crystalline polymers, and high melting crystalline polymers. Low melting crystalline polymers are generally characterized by melting temperatures of from about 35 to about 80° C., desirably from about 40 to about 70° C. and preferably from about 45 to about 60° C. Intermediate melting point crystalline polymers are characterized by having melting points of from about 80 to about 110° C., desirably from 85 to about 105° C. and preferably from about 90 to about 100° C. High melting point crystalline polymers are generally characterized by having melting points of from about 100 to about 175° C., desirably from about 105 to about 140° C. and preferably from about 110 to about 125° C. While the Tg of the crystalline polymers can vary, desirably they range from −30° C. to 110° C. and preferably from −25° C. to 80° C.

Although two or more crystalline polymers can be utilized having different degrees of crystallinity as well as different melting temperatures, it is highly desirable that such polymers be compatible so as to minimize any large scale phase separation in blending and preferably to ensure that no phase separation occurs. Relative polymer compatibility can be qualitatively assessed by Hildebrand's solubility parameters. The solubility parameters of the various individual crystalline polymers can range from about 7.0 to about 11.5 calories $^{1/2}$/cc$^{1/2}$ and preferably from 8 to 10.5 calories $^{1/2}$/cc$^{1/2}$. Different polymers utilized in the same composition should differ in their solubility parameters by no greater than 1.5 and preferably no greater than 0.5 calories $^{1/2}$/cc$^{1/2}$. For apparently non-compatible polymers, phase mixing can be achieved by co-crosslinking or by using a compatibilizing agent such as a block copolymer.

In addition to the TAST composition containing at least one polymer which is crystalline at room temperature, another important aspect in achieving the desired reversibility of shape transformations is the requirement of a three-dimensional network. Generally, the rate of crystallization and the degree of crosslinking, that is the formation of a three-dimensional network, affect the relative ease of shape transformations and the degree of reversibility thereof. Too much crosslinking can inhibit crystallization and thus, significantly reduce the tendency to exhibit adequate freezable deformation. On the other hand, too little crosslinking can lead to large irreversible deformation or permanent set. The present invention requires a balance between these two factors. Inasmuch as significant amounts of an elastomer are generally contained in the TAST composition, the degree of crosslinking is discussed herein below with regard to the overall composition in terms of swelling.

Crystalline polymers which meet the above criteria can be readily determined with regard to such polymers having generally low melting points. They include some ethylene propylene diene terpolymers (EPDM), the various ethylene vinyl acetate polymers, and some chlorosulfonated polyethylenes. It is important to the present invention that the various crystalline polymers have a proper degree of crystallinity as set forth above as well as a proper molecular weight. The molecular weight is generally measured in terms of Mooney viscosity or melt flow index (ASTM D1238). The various EPDM terpolymers of the present invention generally have a Mooney viscosity, ML 1+4 at 121° C., of from about 10 to 100 and desirably from about 40 to about 70. The amount of the various components therein, that is the amount of the ethylene, the amount of the propylene, etc., is generally a conventional amount as well as such amounts known to the art and to the literature. Suitable EPDM polymers include the various Nordel polymers made by DuPont such as Nordel 2722, 1145, 2744, and the like. The ethylene-vinyl acetate copolymers generally have a vinyl acetate content of from about 9 to about 40%. The molecular weight is generally determined in terms of a melt index accordingly to ASTM D 1238 and is from about 2 to about 45 and preferably from about 5 to 30 g/10 min. C.ommercial sources of the various grades include Elvax Manufactured by DuPont and ULTRATHENE manufactured by U.S. Industrial C.hemicals C.o. The crystalline chlorosulfonated polyethlenes generally have a Mooney viscosity, ML 1+4 at 100° C. of from about 30 to about 80 with from about 30 to 45 being desirable. A suitable source of such low temperature crystalline polymers are the various Hypalons manufactured by DuPont.

Suitable intermediate melting point crystalline polymers include various ionomers such as sodium based ionomers, and various stereoregular polydienes (e.g. 1,2-trans, 1,4-trans). Various polyethylenes including low density, as well as various chlorinated polyethylenes can be utilized as intermediate melting point crystalline polymers. C.onsidering the ionomer polymers, the term "ionomer" is generic for polymers containing interchain ionic bonding. These ionic crosslinks occur randomly between the long chain polymer molecules to produce solid state polymers. Ionomers are based on sodium or zinc salts of ethylene/(meth)acrylic acid copolymers. The melt flow index of the various ionomers can range from about 0.5 to about 15 g/10 min. with from about 1.0 to about 5.0 g/10 min. being desired. Suitable sources of ionomers include the various Surlyn resins manufactured by DuPont such as Surlyn 8528, Surlyn 8660, and the like. Considering the various stereoregular polydienes, they are crystalline and hence generally have a 1,2-trans structure or a 1,4-trans structure. Dienes made from monomers containing from 4 to 12 carbon atoms can be utlized. Preferred polymers include trans-1,2-polybutadiene, trans-1,4-polychloroprene, and trans-1,4-polyisoprene. The melt flow index of the trans-1,2-polybutadienes is generally from about 1.0 to about 5.0 and desirably from about 2 to about 4 gr/10 min. Examples of suitable sources include the various trans-1,2-polybutadienes manufactured by Japan Synthetic Rubber Company, the various trans-1,4-polyisoprenes from Polysar Inc., and the like. The low density polyethylenes generally have a melt index of from about 1.0 to about 70 gr/10 min. and desirably from about 2.5 to about 50 gr/10 min. Examples of suitable low density polyethylene resins include the various Dowlex LDPE manufactured by the Dow Chemical Company, the various AC. LDPE manufactured by Allied Chemicals and the various petrothenes manufactured by U.S. Industrial Chemicals Co. The chlorinated polyethylenes which can be utilized as either an intermediate or a high melting point crystalline polymer generally have a melt viscosity of from about 8,000 to about 35,000 poises and desirably from about 10,000 to about 24,000 poises based on DOW test method CPE-D3. A suitable source of such chlorinated polyethylenes are the CPE series of polymers manufactured by Dow.

Various high melting point crystalline polymers can also be utilized meeting the above criteria including various linear low density polyethylenes, various high density polyethylenes, various chlorinated polyethylenes, various polycaprolactones, and various polyurethanes. The melt index of the various linear low density polyethylenes is generally the same as the various low density polyethylenes set forth herein above. With regard to the various high density polyethylenes, the melt index is generally from about 0.05 to about 40 and desirably from about 1 to about 30 gm/10 min. A desirable source of such high density polyethylenes are the various HDPE manufactured by Union Carbide. The chlorinated polyethylenes are the same as set forth hereinabove. Various polycaprolactones can be utilized having the above-noted crystallinity. Generally polycaprolactones which can be utilized having a molecular weight of from about 10,000 to about 500,000 and desirably from about 20,000 to about 40,000 gm/mole. Examples of such suitable polycaprolactones include the various Tone-polymers such as PC.L-700 manufactured by Union Carbide. Various polycaprolactones can also be utilized as intermediate melting point crystalline polymers. The polyurethanes generally include polyether, polyester and polyurea based polymers. The polyurethanes generally have a viscosity of from about 180 to about 6,000 centipoises and desirably from about 400 to about 1500 centipoises based on Brookfield RVF viscometry at 23° C. with 15% solids in tetrahydrofuran. The Estane thermoplastic polyurethanes manufactured by B. F. Goodrich can be utilized such as resin 5707 F1, resin 5714 F1, and the like.

Although specific compounds have been set forth hereinabove with regard to crystalline polymers which can be utilized in the present invention, it is to be understood that other similar polymers can be utilized which have the above indicated degree of crystallinity and similar molecular weights as set forth above. Such polymers are known to those skilled in the art as well as to the literature. For example, numerous different types of polyethylenes exist other than the specific types set forth hereinabove. Rather than to list all possible types, a representative type of polymer has been set forth, it being understood that other similar types of polyethylenes can be utilized. The same statement is true with regard to the other types of crystalline polymers.

Preferred crystalline polymers generally include the various chlorosulfonated polyethylenes, the ethylene vinyl acetate polymers, the polyethylenes, the transpolyisoprenes and the various EPDM copolymers.

Each type of the above noted crystalline polymers can either be utilized by itself, or in combination with one or more of the remaining crystalline polymers.

An elastomeric component, that is one or more elastomers, is utilized in association with the above crystalline polymers to form the low-temperature TAST compounds of the present invention. By the term "elastomeric" it is meant that a polymer which exhibits large recoverable deformation and possesses a relatively high molecular weight, in excess of 50,000 g/mole and has a very low Tg, that is $-25°$ C. or less and preferably $-30°$ C. or less. Generally any elastomer can be utilized which is elastomeric at room temperature. Accordingly, specific elastomers are often chosen with regard to imparting desirable end properties such as oil resistance, abrasion resistance, weather resistance, solvent and chemical resistance, low permanent set and the like. It is further desired that the various elastomers have good compatibility with the crystalline polymers such that a single phase blend is produced. The solubility parameters of the various elastomers are generally within a desired range required for phase mixing with the crystalline polymers. That is, it is desirable that the Hildebrand's solubility of the elastomers be similar to that of the crystalline polymers and hence range from about 7.0 to about 11.5 cal $^{1/2}$/cc$^{1/2}$ with the various different polymers being utilized having a difference in solubility parameter of no greater than 1.5 and preferably no greater than 0.5 in the same composition.

Examples of suitable elastomers include non-crystalline random amphorous polymers such as those made from polymerizing conjugated dienes having from about 4 to about 12 carbon atoms and preferrably from about 4 to about 8 carbon atoms, as well as copolymers thereof. Examples of such dienes include 1,3-butadiene, isoprene, 2,3-dimethyl-1,3-butadiene, hexadiene, heptadiene, octyldiene, pentadiene, 2-methyl-1,3-pentadiene, phenyl-1,3-butadiene, and the like. Generally, cis-1,4-polyisoprene either natural or synthetic, and cis-1,4-polybutadiene are preferred. Copolymers of the various above noted conjugated dienes with vinyl substituted aromatic monomers having from 8 to 12 carbon atoms, or acrylonitrile, or halogenated conjugated dienes may also be utilized provided that they are generally elastomeric. Examples of vinyl substituted aromatic monomers include styrene, 1-vinyl-naphthalene, 2-vinyl-naphthalene, alpha-methylstyrene, 4-t-butylstyrene, 4-phenylstyrene, 2-ethyl-4-benzylstyrene, 3-n-propyl-2-vinylnaphthalene, and the like. Generally, elastomeric copolymers as made from styrene and butadiene monomers are preferred.

Other suitable elastomeric compounds include copolymers of butadiene and acrylonitrile, polychloroprene and ethylene-propylene diene, and the like. Still other elastomeric compounds include the various epichlorohydrins such as Hydrin 100 and Hydrin 200 manufactured by BFGoodrich. Regardless of the various types of elastomers utilized, or any combinations thereof, they generally can be compounded to a Mooney viscosity of from about 30 to about 120 and desirably from about 40 to about 80 ML 1+4 at 100° C. Elongation at break should be at least 150% after crosslinking.

The amount of one or more crystalline polymers utilized in association with one or more elastomers can generally vary over a wide range so long as a compatible composition or a single homogeneous phase, low-temperature TAST composition is produced. Accordingly, the amount of the crystalline component is from about 5% to about 90% by weight, desirably from about 10% to about 75% by weight and preferably from about 25% to about 60% by weight based upon the total weight of said crystalline component and said elastomer component.

The crystalline-elastomer composition is formed by mixing the crystalline component and the elastomer component in any conventional manner. Accordingly, conventional mixers such as open roll mills, internal mixers and twin screw mixers can be utilized. In order that a three dimensional network, that is a crosslinked network, is formed upon heating, various crosslinking agents can be added. Such agents are generally conventional and are well known to the art and to the literature. Thus various sulfur compounds, various peroxide compounds, various isocyanate and polyol compounds, and various metallic oxides can be utilized in effective and conventional amounts well known to the art as well as to the literature. Alternatively, crosslinking can be effected by radiation techniques as well as those known to the art and to the literature. Electron beam radiation can thus be utilized to crosslink the composition once a desirable form or end article has been made.

Generally, the crystalline component, the elastomer component, and the crosslinking agents are mixed together and heated to form a desired article. For example, an extruded tube, a sheet, or the like. The shaped TAST article so formed is elastomeric at ambient or at room temperature, is thermally deformable at a low temperature, contains a crosslinked network, is a single phased composition, and has a single overall glass transition temperature. By ambient it is meant a temperature of from about 15° C. to about 70° C. and preferably from about 20° C. to about 50° C. Naturally, such elastomeric composition are resilient, flexible, stretchable, pliable, and the like.

The shaped articles are deformable at relatively low temperatures. That is, at temperatures at from about 40° C. to about 100° C. and preferably from about 45° C. to about 70° C.

The shaped articles are crosslinked by heating to a temperature above the cure temperature of the crosslinking agents. Crosslinking can occur at any state of the process so long as the article is in suitable final form, for example an extruded tube or a sheet. Cure can occur at a suitable cure temperature. Such a temperature is below the degradation temperature of any of the components and generally is from about 135° C. to about 177° C. The degree or extent of crosslinking is generally measured by a swelling index. Linear swell of the cured TAST compositions of the present invention is generally from about 1.1 to about 3.0 and desirably from about 1.3 to about 1.9 times the original size. Swelling generally occurs by immersing the samples or article in a suitable solvent. The above swell indexes were obtained by utilizing a 50/50 weight mixture of isooctane and toluene. The estimated volume swell ratio generally exhibits an increase of from about 1.3 to about 27 and desirably from 3.0 to about 15.0 based upon the original volume. The swell ratio can be adjusted by utilizing different amounts of different polymers, and by adjusting the degree of crosslinking. Of course, if electron beam curing is utilized, the compositions are crosslinked at or near room temperature.

It has been found that the TAST compositions of the present invention have a single but broad melting peak as well as a single Tg. The significance of a single (Tg) is that effective phase mixing amoung the various polymers has occurred thereby forming essentially a single phase material. If microphase separation had occurred, the individual polymers would have retained their unique Tg. As noted above, the existence of a single phase is an important factor affecting the performance of the final product. Accordingly, selection of polymers having close Hildebrand's solubility parameters are important. The TAST compositions of the present invention generally have a Tg of from about $-10°$ C. to about $-60°$ C. and desirably from about $-20°$ C. to aobut $-50°$ C.

In order to promote compatibility of the composition, various compatibilizing agents can be utilized in conventional amounts. Examples of various compatibilizing agents are known to the art as well as to the literature and include block copolymers such as (styrene)-(butadiene)-(styrene)- or Kraton copolymers manufactured by Shell Chemical Co., and the like. The amount of such agents is generally from about 1.0 to about 20 parts by weight based upon 100 combined parts by weight of said crystalline and said elastomer component. Reinforcing fillers such as carbon black, finely divided silica, plate like mica, glass spheres, and the like, can also be added to enhance modulus and to increase tear and tensile properties. Various other additives such as antioxidants, various antiozonants, ultraviolet light inhibitors, various colorants including pigments and dyes, various flame retardants, various fungicides, various heat stabilizers, various lubricants, various plasticizers, various preservatives, and the like can also be utilized. These types of additives including specific examples thereof are known to the art and to the literature. With regard to such suitable compounds, any edition of Modern Plastics Encyclopedia, various rubber technology textbooks and the like can be utilized as well as the various yearly editions thereof, which are hereby fully incorporated by reference.

The TAST compositions of the present invention can be prepared according to various methods as set forth hereinabove. To the mixing or during the formation thereof can be added various compatibilizing agents and other additives such as reinforcing fillers, pigments, antioxidants, plasticizers, and other agents as noted above. Mixing of the various agents is continued until a uniform distribution is obtained.

The next step is the forming and shaping of the mixture composition into a desired shaped article suitable for end use application. The forming and shaping operation can be carried out in any conventional manner well known to the art and to the literature. Suitable operations include extruding, sheeting, molding, (compression, transfer compression, injection), vacuum forming, and the like at a temperature below the degradation temperature of the TAST composition. Extruding can form tubular articles, ribbons, strands, and the like. Generally any shape currently produced by a molding operation can be produced by molding the mixture composition. The article can be cured during the forming process if a crosslinking agent was added or the shaped article can be post cured by radiation technique such as electron beam treatment. The amount of heat, the type of curing agents, and the method at crosslinking, and the like are as set forth hereinabove.

Once a desired cured shaped article has been formed, it can be deformed to a second desired shape at a TAST temperature and then applied to a desired end use. The post deformation technique varies according to the configuration of the initially molded article. For pre-expanded extruded tubes, the tubes can be preheated either by hot air or in a liquid medium and then post expanded while hot. Expansion of the heated tube can be done by either introducing a known amount of pressurized air inside the heated tube tube or by enlarging the heated tube with some mechanical device. Once the desired deformation is completed, cooling of the expanded tube in a cold medium (e.g. ice water, liquid nitrogen or $CO_2$) immediately follows to retain the new shape.

For example, the expanded tube can be applied about wire, about cable, to tool handles, hoses, and the like and then permitted to heat. Upon heating, it will shrink and securely engage the article, that is grasp the same. Since the amount of shrinkage is generally from about 10 to about 500 % of the expanded dimensions, the pre-expanded TAST article can be applied to many objects including those having unusual configurations so long as the object size is within the shrinkable range. Generally, the compositions of the present invention can be utilized wherever TAST articles having an elastomeric properties are desired.

Many other end uses exist such as supports for foundation garments e.g. brassieres, girdles, and the like. Still another use is for an end article which is deformed, twisted, compressed, or the like. Such an article can be a deformed figurine.

In any event, the deformed article or partially deformed article about the object will return, or if restrained attempt to return, to its original size and shape when subsequently reheated. Thus, with regard to various foundations garments, when heated as in a clothes dryer, the various supports, thereof, if bent, twisted, etc. will be returned or converted to their original state.

If an article has been bent, deformed, twisted, etc., when subsequently reheated, it will return to its original untwisted, non-deformed, etc. state. According to the aspects of the present invention, the compositions are truly reversible. That is, once a composition has been formed into a desired shape, deformed to a particular configuration and then shrunk back to its original state, such a process can be repeated many times. Other advantages are that the compositions of the present invention are resistant to ultra violet and ozone (weathering resistant) have a low odor, are non-staining and are generally highly color fade-resistant.

The present invention will be better understood to reference to the following examples.

EXAMPLE 1

A TAST composition for coding a gasoline hose contained various ingredients as set forth in Table I:

TABLE I
TAST ELASTOMER COMPOSITION

| INGREDIENTS | PARTS BY WEIGHT RANGE | TYPICAL |
|---|---|---|
| Chlorosulfonated Polyethylene, SO$_2$Cl—PE (Approx. 20% crystalline) | 40–60 | 40 |
| Poly(ethylene vinyl acetate), EVA (Approx. 20% crystalline) | 5–20 | 15 |
| Polyacrylonitrile butadiene rubber, NBR | 30–60 | 50 |
| Polychloroprene rubber, CR | 10–30 | 10 |
| Titanium dioxide (Rutile) | 20–40 | 20 |
| Methylene bis-(ethylbutyl)-phenol | 1–3 | 1 |
| Magnesium oxide | 2–10 | 2 |
| Organic Color Pigment (e.g. Chromophtal Pigments from Ciba Geigy) | 2–8 | 5 |
| Peroxide (e.g. - Bis(t-butyl peroxy) (diiosopropyl benzene) (crosslinker) | 0.8–5.0 | 1.0 |
| Pentaerythritol ester (plasticizer) | 5 to 20 | 10 |
| TOTAL | | 155.00 |
| SPECIFIC GRAVITY | 1.0 to 1.3 | 1.19 |

Semi-scale up mixing of the above compounds were made in a size 1D Banbury mixer. The 1D Banbury has mixing capacity of about 30 pounds of compound based on a specific gravity of 1.0.

The mixing procedures were as follows:

| CUMMULATIVE TIME (MINUTES) | INGREDIENTS ADDED |
|---|---|
| 0 (beginning) | All polymers plus pigment (color and titanium dioxide) |
| 1 | Pentaerythritol ester |
| 1½ | Methylene bis-(ethyl butyl)-phenol |
| 2 | Magnesium oxide |
| 3.5–4.0 | Dump Stock |

Sheet out dumped stock and allow to cool to room temperature before mixing in the peroxide on a 2-roll mill. The temperature of this mixed stock should not exceed 100 C. as the peroxide was added to avoid premature curing.

This particular compound was extruded in thin wall tubes of the following dimension: 0.750'- ID; 0.830'- OD. The extruded tubes were then post expanded to 1.500'ID to give a 100% post expansion or shrinkage ratio.

The post expanded tube was used to shrink onto a 1'-OD gasoline hose. This application was intended to color code different grades of gasoline. The heat shrink temperature was about 70° C. Both a heating gun and boiling water were successfully used to heat shrink sections of post expanded tubes onto the 1'-OD gasoline lines.

Due to the specialized nature of the application, in house test methods have been devised in addition to commonly used methods to screen and test the compound. The test methods and conditions used are described below:

Linear Swelling in Fuel C.

Test specimens measuring approximately 2.5 cm×0.18 cm×0.10 cm were used. Each specimen was immersed in a 50/50 mixture of isooctane and toluene (fuel C) at ambient temperature over an extended period of time. The degree of fuel resistance was expressed in terms of a volume swell ratio, ($Q_s$); $Q_s$ is simply the linear swell index taken to third power, that is:

$$Q_s = \left(\frac{\text{Swollen length}}{\text{Sample length before swelling}}\right)^3$$

Abrasion Resistance (ASTM D2228)

Test conditions were:

4500 gram load 60 rpm × 80 revolutions

Accelerated Weather Aging

A. Actual outdoor exposure

Sample strips measuring about 7.5 cm×1.2 cm×0.10 cm were mounted in a flexometer which is located outdoors. The turning of the flexometer caused the individual strip to undergo a dynamic bending mode.

B. Accelerated Weather Aging (ASTM D750-68)

Carbon arc apparatus under both wet and dry cycling conditions for 1000 hours.

Ozone Resistance 100 pphm of ozone for 7 days and 100° F.

Stress-Strain Properties

Standardized dumbbell specimens were used and pulled with an Instron at 50 cm per minute rate.

Aside from the above physical tests, rheological characterization using the capillary rheometer and morphological analysis using the Differential Scanning Calorimeter were also made to assure optimum processing of the compounds.

The results of the above tests are summarized in the table below.

| GASOLINE-CODING PUMP HOSE SHEATH PROPERTIES | |
|---|---|
| RESISTANCE TO GASOLINE | 100% VOLUME SWELLING IN FUEL C |
| ABRASION RESISTANCE | PICO ABRASION INDEX OF 60 MINIMUM |
| COLOR RETENTION | NO SIGNIFICANT FADING OF COLOR FROM ACCELERATED WEATHEROMETER AGING AFTER 1000 HOURS OF WET AND DRY CYCLING |
| OZONE RESISTANCE | NO VISIBLE CRACKS AFTER 7 DAYS @ 100° F., 100 pphm OZONE |
| LOW TEMPERATURE FLEXIBILITY | REMAIN FLEXIBLE DOWN TO −40° F., |

-continued

GASOLINE-CODING PUMP HOSE SHEATH PROPERTIES

| | |
|---|---|
| HIGH TEMPERATURE TEST | NON-TACKY ON TOUCHING AFTER HEATED TO 150° F. |
| VOLUME SWELL | $Q_s$ IS LESS THAN 2. |

| STRESS-STRAIN CHARACTERISTICS | |
|---|---|
| 100% MODULUS, PSI (MPa) | 295 (2.0) |
| 300% MODULUS, PSI (MPa) | 610 (4.2) |
| MODULUS @ BREAK, PSI (MPa) | 2340 (16.1) |
| ELONGATION @ BREAK, % | 1260 |
| TEAR STRENGTH, DIE C, PLI(KN/m) | 260 (45.3) |

MANUFACTURING

The sequence of manufacturing the sleeve for a heat-shrink fitting over existing hose is shown in the diagram below:

MIXING→PELLETIZING→EXTRUSION→
CROSSLINKING→POST EXPANSION→
READY FOR HEAT SHRINKING

Crosslinking of this particular compound can be done by conventional heat-activated chemical means or by radiation technique. However, for the specific application with which the compound is intended for, the use of radiation (electron beam accelerator) would be the most preferable. With a 3 MeV electron beam, the recommended radiation dosage would be between 10–15 MRADS (MEGARADS).

FIG. 1 is a chart showing the Tg and Tm of the various major polymers of the composition set forth in Table I. The thermal transitions were measured in a Perkins Elmer's DSC. 4 system. The sample was scanned at 20° C. per minute rate in nitrogen from −100° C. to 100° C. As apparent from FIG. 1, the various polymers each had a distinct Tg. However, the quarternary blend had only a single Tg thereby indicating these existence of only a single phase composition.

EXAMPLE II

The above composition has also been successfully crosslinked by treating it with electron beam. In this case, the same composition shown in Table I was mixed in the absence of magnesium oxide and the peroxide. All the processing steps were identical except the curing stage. In this case, the extruded, non-crosslinked tubing was separtely passed under a beam of high voltage electrons emanating from a 3.5 Kev electron beam source. As the tube passed under the electron beam source, the high voltage electrons bombarded the extuded tube, causing it to be crosslinked. The process was continuous. The crosslinked tubing was then post expanded in a similar way as described in Example I.

EXAMPLE III

Another formation illustrating the usefulness of the concept of the present invention in a toy-related application is described in Table II.

TABLE II

| TAST TOY FORMULATION | |
|---|---|
| INGREDIENTS | PARTS BY WEIGHT |
| Chlorosulfonated polyethylene (Hypalon 45, DuPont) | 96 |

TABLE II-continued

| TAST TOY FORMULATION | |
|---|---|
| INGREDIENTS | PARTS BY WEIGHT |
| Polyethylene vinyl acetate (UE 649-04, USI) | 10 |
| Titanium dioxide (Titanox 2160 N&L Ind.) | 5 |
| Magnesium oxide | 5 |
| Tetrone A | 0.4 |
| Luperco 800Z-40KE (peroxides) | 2.8 |
| | 113.4 |

The compound was mixed also in a 1D Banbury, followed by calendering to approximately 0.040' thick sheet. The sheet was cured by pressing it between large steel platens 340° F. (171° C.) for 30 minutes.

Individual sheets measuring 12'×12' were then cut out of the pressed sheet for screen printing. For this example, a human figurine was printed on the individual sheets. Upon drying of the ink, the figurines were die-cut. Each figurine was then heated to about 70° C. in how water. While hot, the figurine was folded and frozen into a second, transformed shape illustrated below:

| REVERSIBLE | | |
|---|---|---|
| (SHAPE 1) | | (SHAPE 2) |
| die cut Figurine | heat activated | transformed and frozen |

Shape number 2 can be retransformed back to Shape 1 by heating. The process can be repeated many times.

EXAMPLE IV

The following is an example of a electron-beam cured heat-shrinkable compound which was based on a blend of a nitrile butadiene rubber with two different crystalline polyurethanes. The compound offers excellent resistance to oil and to organic solvents.

| INGREDIENTS | |
|---|---|
| Nitrile butadiene rubber (33% nitrile; Hycar 1032-45 BFG) | 40 |
| Polyurethane: | |
| Estane 5714 | 40 |
| Estane 5707 | 20 |
| Butyl oleate plasticizer | 10 |
| Hi-Sil 233 | 20 |
| Titanium Dioxide (Titanox 2016, NL) | 25 |
| A.O. 425 (methylene-bis-ethylbutyl phenol) | 1.0 |
| | 156 |

Electron beam current and voltage conditions used were:
3.5 million electron volts
average Electron Dosage 7.5 mega Rads

| PHYSICAL PROPERTIES | |
|---|---|
| Stress-strain characteristics, | |
| 100% stress, psi (MPa) | 533 (4.36) |
| 300% stress, psi (MPa) | 740 (5.10) |
| stress @ break, psi (MPa) | 1570 (10.8) |
| elongation @ break, % | 740 |

| -continued | |
|---|---|
| freezable strain % | 50 |

EXAMPLE V

The example below illustrates the use of a sulfur-cured TAST compound to make handle grips for athletic sport items such as a baseball bat grip, golf club grip, etc.

| INGREDIENTS | PARTS BY WEIGHT |
|---|---|
| Trans-1,4-polyisoprene | 30 |
| Natural rubber (cis-1,4-polyisoprene) | 10 |
| Chlorosulfonated polyethylene | 60 |
| N339 carbon block | 25 |
| Process oil (e.g. Flexon 743) | 5 |
| Antioxidant 425 | 1.5 |
| Zinc oxide | 5 |
| Stearic acid | 1.5 |
| 4,4-dithiodimorpholine (sulfasan R) | 2.4 |
| Tetramethyl thiuram disulfide | 0.5 |
| | 140.7 |
| Accelerators - sulfur donor cure system | |

All of the ingredients except the curatives were mixed in an internal Banbury until the stock temperature reached approximately 177° C. when the stock was dumped. The curatives were subsequently added to the cooled stock using an open 2-roll mill. The mixing of the curatives on the 2-roll mill was completed in less than two minutes, making sure that the temperature of the mix did not exceed 100° C.

The compound was cured into a ¾' - ID tubes in a steam autoclave for about an hour at 148° C. The tubular sample was preformed by hand laying thin layers of the uncured compound about a ¾' steel or aluminum mandrell until a 0.060' thick wall was formed. Water pre-soaked nylon wrapper was then applied over the pre-formed cylinder and tied tightly at both ends for autoclaving.

The cured cyclinder was then post expanded by forcing the heated cured cylinder over a mandrel with the desired diameter. For example, if a expansion ratio of 2 to 1 was desired, a 2' diameter mandrell was used.

The post expanded cylinder can be heat shrunk over any sporting good with a handle diameter equal or less than the ¾' diameter, providing a frictional grip. Stress-strain properties of the sporting goods grips shown in the Table of example are summarized below:

| HEAT-SHRINKABLE SPORTING GOODS GRIPS | |
|---|---|
| 100% stress, psi (MPa) | 450 (3.15) |
| 300% stress, psi (MPa) | 1675 (11.5) |
| Stress @ break, psi (MPa) | 1770 (12.2) |
| Elongation a break, % | 325 |

While in accordance with the Patent Statutes a best mode and a preferred embodiment have been set forth in detail, the scope of the present invention is not limited thereto, but rather by the scope of the attached claims.

What is claimed is:

1. A single phase thermally activatable shape transformable elastomeric composition consisting essentially of:
the composition, said composition having a single phase, a single Tg within a range of from about −10° C. to about −60° C., and a single thermally activatable shape transformable melting temperature, said composition being a blend of at least one crystalline polymer and at least one low Tg elastomeric polymer in an effective amount as to form said single phase, said single Tg, and said single thermally activatable shape transformable melting temperature, said melting temperature being from about 40° C. to about 100° C., said low Tg elastomeric polymer having (a) an elongation of at least 150% at break after crosslinking, (b) a large recoverable deformation of less than said break elongation, and (c) a Tg of −30° C. or less, said crystalline polymer having (a) a crystallinity of from about 5% to about 95%, (b) a Tg of from −30° C. to about 110° C., and (c) a melting temperature of from about 35° C. to about 175° C., wherein the amount of said crystalline polymer is from about 25 percent to about 60 percent by weight based upon the total weight of said elastomer polymer and said crystalline polymer and wherein the amount of said elastomer polymer is from about 40 percent to about 75 percent by weight based upon a total weight of said elastomer polymer and said crystalline polymer.

2. A single phase thermally activatable shape transformable elastomeric composition according to claim 1, wherein said crystalline polymer and said elastomer polymer have a Hildebrand solubility parameter of from about 7.0 to about 11.5 calories $^{1/2}/cc^{1/2}$, and wherein said composition is a homogeneous blend.

3. A single phase thermally activatable shape transformable elastomeric composition according to claim 2, wherein the crystallinity of said crystalline polymer is from about 10% to about 45%, wherein said composition has a linear swell index of from about 1.1 to about 3.0, wherein said crystalline polymer is ethylene vinyl acetate, an ethylene propylene diene terpolymer, a chlorosulfonated polyethylene, an ionomer, a stereoregular polydiene made from a monomer having from 4 to 12 carbon atoms, a polyethylene, a chlorinated polyethylene, a polycaprolactone, a polyurethane, and combinations thereof; wherein said elastomer is a homopolymer made from a conjugated diene having from 4 to 12 carbon atoms, a copolymer made from a conjugated diene having from 4 to 12 carbon atoms and a vinyl substituted aromatic having from 8 to 12 carbon atoms, a copolymer made from conjugated diene having from 4 to 12 carbon atoms and acrylonitrile, a copolymer made from a conjugated diene having from 4 to 12 carbon atoms and a halogenated conjugated diene, a copolymer made from a conjugated diene having from 4 to 12 carbon atoms and ethylene and propylene monomers, a polymer made from epichlorohydrin, chlorprene homopolymer, and combinations thereof.

4. A single phase thermally activatable shape transformable elastomeric composition according to claim 3, wherein said single Tg of said composition is from about −20° C. to about −50° C., and wherein said single shape transformable melting temperature is from about 45° C. to about 70° C.

5. A single phase thermally activatable shape transformable elastomeric composition according to claim 4, wherein said ethylene vinyl acetate has a melt flow index of from about 2 to about 45, wherein said ethylene propylene diene terpolymer has a Mooney viscosity of from about 10 to about 100, wherein said chlorosulfonated polyethylene has a Mooney viscosity of from about 30 to about 80, wherein said ionomer has a melt flow index of from about 0.5 to about 15, wherein said stereoregular polydiene has a melt flow index of from about 1 to about 5, wherein said polyethylene has a melt flow index of from about 0.05 to about 100, wherein said chlorinated polyethylene has a melt viscosity of from about 8,000 to about 35,000 poises, wherein said polycaprolactone has a molecular weight of from about 10,000 to about 500,000 and wherein said polyurethane has a Brookfield RVF viscosity at 23° C. of from about 180 to about 6,000 centipoises.

6. A single phase thermally activatable shape transformable elastomeric composition according to claim 1, which is capable of repeatedly being heat transformable at said temperature of from about 40° C. to about 100° C.

7. A single phase thermally activatable shape transformable elastomeric composition according to claim 5, which is capable of repeatedly being heat transformable at said melting temperature of from about 45° C. to about 70° C.

8. A single phase thermally activatable shape transformable elastomeric composition according to claim 6, wherein said crystalline polymer is chlorosulfonated polyethylene or ethylene propylene diene terpolymer, and wherein said elastomer is an acrylonitrile-butadiene copolymer or ethylene propylene diene terpolymer.

9. A single phase thermally activatable shape transformable elastomeric composition according to claim 7, wherein said crystalline polymer is chlorosulfonated polyethylene or ethylene propylene diene terpolymer, and wherein said elastomer is an acrylonitrile-butadiene copolymer or ethylene propylene diene terpolymer.

10. A reversible thermally activated shape transformable article comprising the composition of claim 9.

11. A single phase thermally activatable shape transformable elastomeric composition, consisting essentially of:
the composition, said composition having a single phase, a single Tg within a range of from about −10° C. to about −60° C., and a single thermally activatable shape transformable melting temperature, said composition being a blend of at least one crystalline polymer and at least one low Tg elastomeric polymer in an effeetive amount as to form said single phase, said single Tg, and said single thermally activatable shape transformable melting temperature, said melting tempertaure being from about 40° C. to about 100° C., said low Tg elastomeric polymer having (a) an elongation of at least 150% at break after crosslinking, and (b) a Tg of −30° C. or less, said crystalline polymer having (a) a crystallinity of from about 5% to about 95%, (b) a Tg of from −25° C. to about 110° C., and (c) a melting temperature of from about 35° C. to about 175° C.;
wherein the amount of said crystalline polymer is from about 25% to about 60% by weight based upon the total weight of said crystalline poloymer and said elastomer polymer, wherein the amount of said elastomer polymer is from about 40% to about 75% by weight based upon the total weight of said elastomer polymer and said crystalline polymer, wherein said composition has a linear swell index of from about 1.1 to about 3.0, wherein said crystalline polymer is ethylene vinyl acetate, a chlorosulfonated polyethylene, an ionomer, a stereoregular polydiene made from a monomer having from 4 to 12 carbon atoms, a polyethylene, a chlorinated polyethylene, a polycaprolactone, a polyurethane, and combinations thereof; wherein said elastomer is a homopolymer made from a conjugated diene having from 4 to 12 carbon atoms, a copolymer made from a conjugated diene having from 4 to 12 carbon atoms and a vinyl substituted aromatic having from 8 to 12 carbon atoms, a copolymer made from conjugated diene having from 4 to 12 carbon atoms and acrylonitrile, a copolymer made from a conjugated diene having from 4 to 12 carbon atoms and a halogenated conjugated diene, a copolymer made from a conjugated diene having from 4 to 12 carbon atoms and ethylene and propylene monomers, chlorprene homopolymer, and combinations thereof.

12. A single phase thermally activatable shape transformable elastomeric composition according to claim 11, wherein said crystalline polymer and said elastomer polymer have a Hildebrand solubility parameter of from about 7.0 to about 11.5 calories $^{1/2}/cc^{1/2}$, wherein said composition is a homogeneous blend;
wherein said single Tg of said composition is from about −20° C. to about −50° C., and wherein said single shape transformable melting temperature is from about 45° C. to about 70° C.

13. A single phase thermally activatable shape transformable elastomeric composition according to claim 12, wherein said ethylene vinyl acetate has a melt flow index of from about 2 to about 45, wherein said chlorosulfonated polyethylene has a Mooney viscosity of from about 30 to about 80, wherein said ionomer has a melt flow index of from about 0.5 to about 15, wherein said stereoregular polydiene has a melt flow index of from about 1 to about 5, wherein said polyethylene has a melt flow index of from about 0.05 to about 100, wherein said chlorinated polyethylene has a melt viscosity of from about 8,000 to about 35,000 poises, wherein said polycaprolactone has a molecular weight of from about 10,000 to about 500,000, and wherein said polyurethane has a Brookfield RVF viscosity at 23° C. of from about 180 to about 6,000 centipoises.

14. A single phase thermally activatable shape transformable elastomeric composition according to claim 11, which is capable of repeatedly being heat transformable at said temperature of from about 40° C. to about 100° C.

15. A single phase thermally activatable shape transformable elastomeric composition according to claim 13, which is capable of repeatedly being heat transformable at said melting temperature of from about 45° C. to about 70° C.

16. A single phase thermally activatable shape transformable elastomeric composition according to claim 11, wherein said crystalline polymer is chlorosulfonated polyethylene and wherein said elastomer is an acrylonitrile-butadiene copolymer or ethylene propylene diene terpolymer.

17. A single phase thermally activatable shape transformable elastomeric composition according to claim 12, wherein said crystalline polymer is chlorosulfonated polyethylene and wherein said elastomer is an acrylonitrile-butadiene copolymer or ethylene propylene diene terpolymer.

18. A single phase thermally activatable shape transformable elastomeric composition according to claim 13, wherein said crystalline polymer is chlorosulfonated polyethylene and wherein said elastomer is an acrylonitrile-butadiene copolymer or ethylene propylene diene terpolymer.

* * * * *